Dec. 31, 1968    S. F. RAK    3,419,360
CHEMICAL FEEDER DEVICE
Filed Feb. 9, 1967
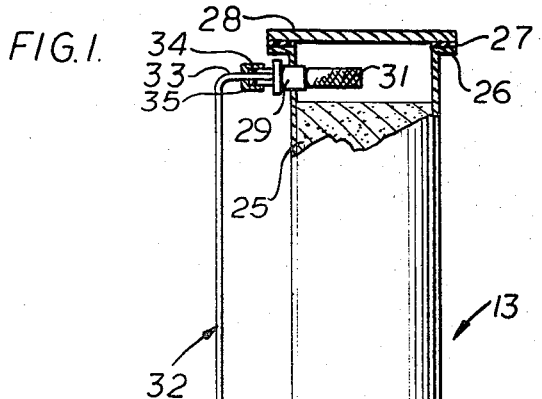
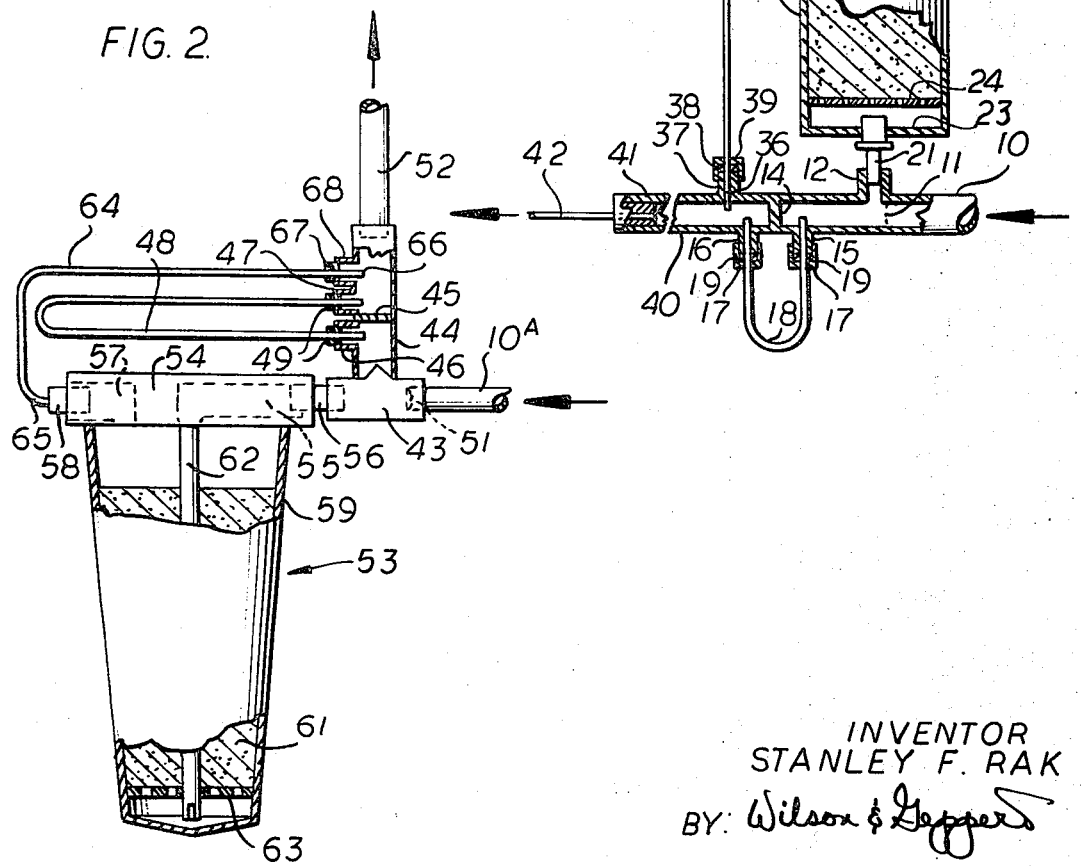
INVENTOR
STANLEY F. RAK
BY: Wilson & Geppert
ATTY'S United States Patent Office 3,419,360
Patented Dec. 31, 1968

3,419,360
CHEMICAL FEEDER DEVICE
Stanley F. Rak, Mundelein, Ill., assignor to Culligan, Inc., Northbrook, Ill., a corporation of Delaware
Filed Feb. 9, 1967, Ser. No. 614,992
2 Claims. (Cl. 23—272.7)

ABSTRACT OF THE DISCLOSURE

A chemical feeding apparatus for the continuous addition of a small quantity of a chemical solution to a stream of liquid by diverting a small proportion of the liquid stream through a container having a solid granular chemical therein; the liquid dissolving the chemical for a solution and recombining the chemical solution with the main liqud stream through a capillary intersecting the main stream at a point downstream of a flow restricting device for the main stream of liquid.

---

The present invention relates to a chemical feeder device and more particularly to a chemical feeding apparatus for a stream of liquid to control the pH or other solution variable.

Prior chemical feeders for a continuously flowing stream of liquid are generally not suitable where a relatively low flow rate is utilized for the liquid stream. The present feeder is especially useful for the control of pH of a water supply. In my copending application Ser. No. 614,954, filed Feb. 9, 1967, on a Drinking Water Treatment Apparatus, utilizing a reverse osmosis module to purify water, it was found that the optimum pH of the influent water is approximately 5.0. A pH value substantially above or below that level will result in an increased deterioration of the membrane in the module. The present feeder can be utilized as an acid feeder to control the pH of water to a more desirable level.

An important object of the present invention is the provison of a chemical feeder for a liquid stream having a relatively low flow rate. The feeder is arranged so that a small portion of the total liquid stream is diverted through a chamber containing the chemical to be added to the liquid stream in a solid granular state. The liquid passing through the chemical chamber dissolves the solid chemical and the resulting chemical solution is returned to the liquid stream downstream of a flow restriction for the liquid stream.

Another object of the present invention is the provision of a chemical feeder having a very low chemical flow rate and a relatively high split ratio for the liquid stream compared to the diverted chemical feed stream. The control of the flow rate and ratio of the two streams is accomplished through the utilization of a capillary to restrict and control the main flow of liquid and a second capillary leading from the feeder unit to the liquid line downstream of the first mentioned capillary. Further, the flow of combined liquid and chemical solution may be further restricted by another capillary within any associated equipment or apparatus receiving the treated solution if a predetermined pressure is to be maintained within the equipment without significantly altering the additive concentration.

A further object of the present invention is the provision of a chemical feeding unit utilized as an acid feeder for lowering of the pH of water. The feeder provides a relatively uniform acid feed ratio over a substantial pressure range. Waters requiring more or less alkalinity neutralization with an acid solution to produce a desired product water pH can be accommodated by decreasing the acid flow restricting capillary, or by decreasing the water flow restricting capillary, respectively.

Further objects are to provide a construction of maximum simplicity, efficiency, economy and ease of assembly and operation, and such further objects, advantages and capabilities as will later more fully appear and are inherently possessed thereby.

In the drawing:

FIGURE 1 is a schematic showing of an embodiment of chemical feeder unit utilized with a liquid flow line, the parts being shown partially in cross section, FIG. 2 is a schematic showing of a second embodiment of chemical feeder unit attached to a liquid flow line, the parts being shown partially in cross section.

Referring more particularly to the disclosure in the drawings wherein is shown illustrative embodiments of the present invention, FIG. 1 discloses a liquid flow line 10 for the flow of water or other liquid to associated equipment (not shown) utilizing the liquid. A strainer screen 11 is positioned in the line 10 ahead of a side port 12 leading to a chemical feeder unit 13. Downstream of the port 12 is a wall or partition 14 in the line 10 with threaded side ports or nipples 15, 16, each port having a threaded cap 17 enclosing one end of a capillary tube or bypass 18. A resilient gland seal 19 is located in each cap 17 to prevent any leakage.

A connector 21 engages the port 12 and is received at its opposite end in an opening in the closed end 23 of the cylindrical body of the feeder 13. A flow distributing perforated plate 24 is positioned in the body 22 spaced from the closed end 23 and supports a bed of solid chemical material 25, preferably in granular form, adapted to be slowly dissolved by the flow of liquid through the feeder 13. The upper open end of the cylindrical body 22 is provided with a radially outwardly extending flange 26 upon which is positioned an annular sealing gasket 27. A flat end plate or closure 28 is removably secured to the flange 26 to provide for ease of replenishing the solid chemical in the body 22. A fitting 29 extends laterally into the body and supports a strainer screen 31 in the body 22 above the bed of chemical material 25.

A capillary tube 32 has one end 33 received in and sealed in the fitting 29 by a gland seal 34 and a cap 35 threadingly engaging the exposed end of the fitting. The opposite end 36 of the tubing 32 extends through a side port 37 in a mixing or recombining chamber 40 downstream of the port 16, and the tubing is sealed therein through a gland seal 38 and a threaded cap 39. The treated liquid then proceeds to its intended use and a conduit 41 from the chamber 40 contains a capillary 42 to control the resultant flow of the recombined liquid. Equipment receiving the treated liquid may be inserted in conduit 41 and, if a predetermined pressure level is desired or required in the equipment, a flow restricting orifice in a plug or the flow restricting capillary 42 extending from the line 41 provides the desired pressure.

In operation, liquid such as water passes through the line 10 and it is desired or required that a small amount of a chemical substance or compound be added to the liquid stream. Therefore, a small proportion of the liquid passing through the screen 11 is diverted through the side port 12 and connector 21 into the feeder 13 where the diverted liquid dissolves a portion of the solid granular chemical to form a concentrated solution. This solution is returned to the liquid stream in the mixing chamber 40 via the capillary tube 32, where the solution recombines with the liquid stream that has passed through the capillary tube 18.

The feeder 13 is particularly adapted as an acid feeder to lower and control the pH of water. As an example which is for purposes of illustration and not intended to limit the scope of the invention, a feeder 13 containing a 14 inch x 2 inch bed of granular fumaric acid having a feed water flow restricting capillary 18 that has a 0.053 inch internal diameter and is 16 inches in length, an acid solution flow restricting capillary 32 that has a 0.015 inch internal diameter and is 16 inches in length, and a treated outlet flow restricting capillary 42 which has a 0.016 inch internal diameter and is 21 inches in length was connected to a Lake Michigan water supply having a pH 7.8 and a total alkalinity of 5.7 grains per gallon (g.p.g.) measured as calcium carbonate. The following table relates the resulting treated effluents obtained at 25° C.

TABLE I

| Pressure, p.s.i. | pH | Alkalinity, g.p.g. as $CaCo_3$ | Flow rate, gallons per day (g.p.d.) |
|---|---|---|---|
| 25 | 6.5 | 3.7 | 6.8 |
| 50 | 6.4 | 3.3 | 12.8 |
| 75 | 6.3 | 3.1 | 15.6 |
| 100 | 6.25 | 2.9 | 19.4 |
| 125 | 6.2 | 2.8 | 22.4 |

These data demonstrate that a relatively uniform acid feed ratio was obtained over the pressure range tested. The flow rate for the feeder is extremely low (approximately 0.12 g.p.d.) and the ratio of the liquid stream to the chemical solution is approximately 120:1 for a water being treated at a flow rate of approximately 14 g.p.d.

FIG. 2 discloses a second embodiment of chemical feeder with a slightly different arrangement of the flow lines therefor. A liquid line 10a enters a T-connector 43 having an elongated branch 44 with a center partition 45. The partition separates side ports 46, 47 for a capillary tube or by-pass 48 sealed in the ports by resilient plugs 49. The line 10a includes a strainer screen 51 at the junction with the T-connector 43. An outlet line 52 extends from the end of the branch 44.

The chemical feeder 53 includes a head 54 having an inlet passage 55 connected to the T-connector by a nipple 56 and an outlet passage 57 receiving a resilient plug 58. A slightly tapered container or bowl 59 threadingly engages the head 54 and contains a bed of granular chemical material 61. An inlet manifold 62 connected to the inlet passage 55 in the head 54 extends downwardly through the chemical material and through a perforated plate 63 supporting the material and acting as a flow distributor for liquid exiting from the open lower end of the manifold 62.

A capillary tube 64 has one end 65 received in a central passage in the resilient plug 58 positioned in the outlet passage 57 in the head, and the opposite end 66 of the tube 64 in a resilient plug 67 in a third side port 68 downstream of the partition 45 and side port 47. This feeder operates in substantially the same manner as the feeder of FIG. 1.

While the pretreatment device or chemical feeder has been shown and described as being advantageously applicable to the control of the pH level of water by use of an acidulent, it is not my desire or intent to unnecessarily limit the scope or the utility of the improved features of these illustrative embodimens.

Having thus disclosed my invention, I claim:

1. A chemical feeding device for a stream of liquid comprising a flow line through which the liquid stream passes, a strainer screen in said flow line, a generally cylindrical housing having an inlet in the bottom of said housing and an outlet in the top of said housing, a conduit connecting said inlet communicating with said flow line downstream of said strainer screen, a flow distributor comprising a perforated plate disposed across the bottom portion of said housing device disposed across the bottom portion of said housing above said inlet, said housing containing a bed of granular solid chemical additive to be dissolved supported on said perforated plate, flow restricting means in said flow line downstream of said conduit to control the rate of liquid flow therethrough comprising a solid partition dividing said flow line into upstream and downstream chambers, and a first capillary tube of substantial length connecting said upstream and downstream chambers, a strainer screen in the outlet of said housing, and a second capillary tube of substantial length connecting the outlet of said housing with the downstream chamber in said flow line downstream of said first capillary tube.

2. A chemical feeding device as set forth in claim 1, including a T-connector downstream of said screen in said flow line, said flow line exiting through the vertical leg of said T-connector, said housing including a head containing said inlet and outlet and a depending bowl containing the bed of granular additive, said inlet being connected to the aligned branch of said T-connector, said flow restricting means being positioned in the vertical leg, said perforated plate is positioned adjacent the bottom of the depending bowl, and an inlet manifold extending from the inlet in said head through the bed of chemical additive and said perforated plate and terminating in an open end below said perforated plate.

References Cited

UNITED STATES PATENTS

| 1,142,292 | 6/1915 | White | 23—272.7 |
| 1,940,965 | 12/1933 | Nash | 23—272 X |
| 2,758,878 | 8/1956 | Dominick | 23—272.8 |
| 3,195,558 | 7/1965 | Klueber | 23—272.7 X |
| 3,228,040 | 1/1966 | Currie | 23—272.7 X |

FOREIGN PATENTS

| 1,310,863 | 10/1962 | France. |
| 1,332,935 | 6/1963 | France. |
| 371,270 | 9/1963 | Switzerland. |
| 1,197,065 | 7/1965 | Germany. |

NORMAN YUDKOFF, *Primary Examiner.*

S. EMERY, *Assistant Examiner.*

U.S. Cl. X.R.

23—311; 239—310, 317

UNITED STATES PATENT OFFICE
CERTIFICATE OF CORRECTION

Patent No. 3,419,360                                                          December 31, 1968

Stanley F. Rak

It is certified that error appears in the above identified patent and that said Letters Patent are hereby corrected as shown below:

Column 4, line 7, cancel "communicating"; lines 9 and 10, cancel "disposed across the bottom portion of said housing device".

Signed and sealed this 24th day of March 1970.

(SEAL)
Attest:

Edward M. Fletcher, Jr.                      WILLIAM E. SCHUYLER, JR.

Attesting Officer                                Commissioner of Patents